Figure 1:
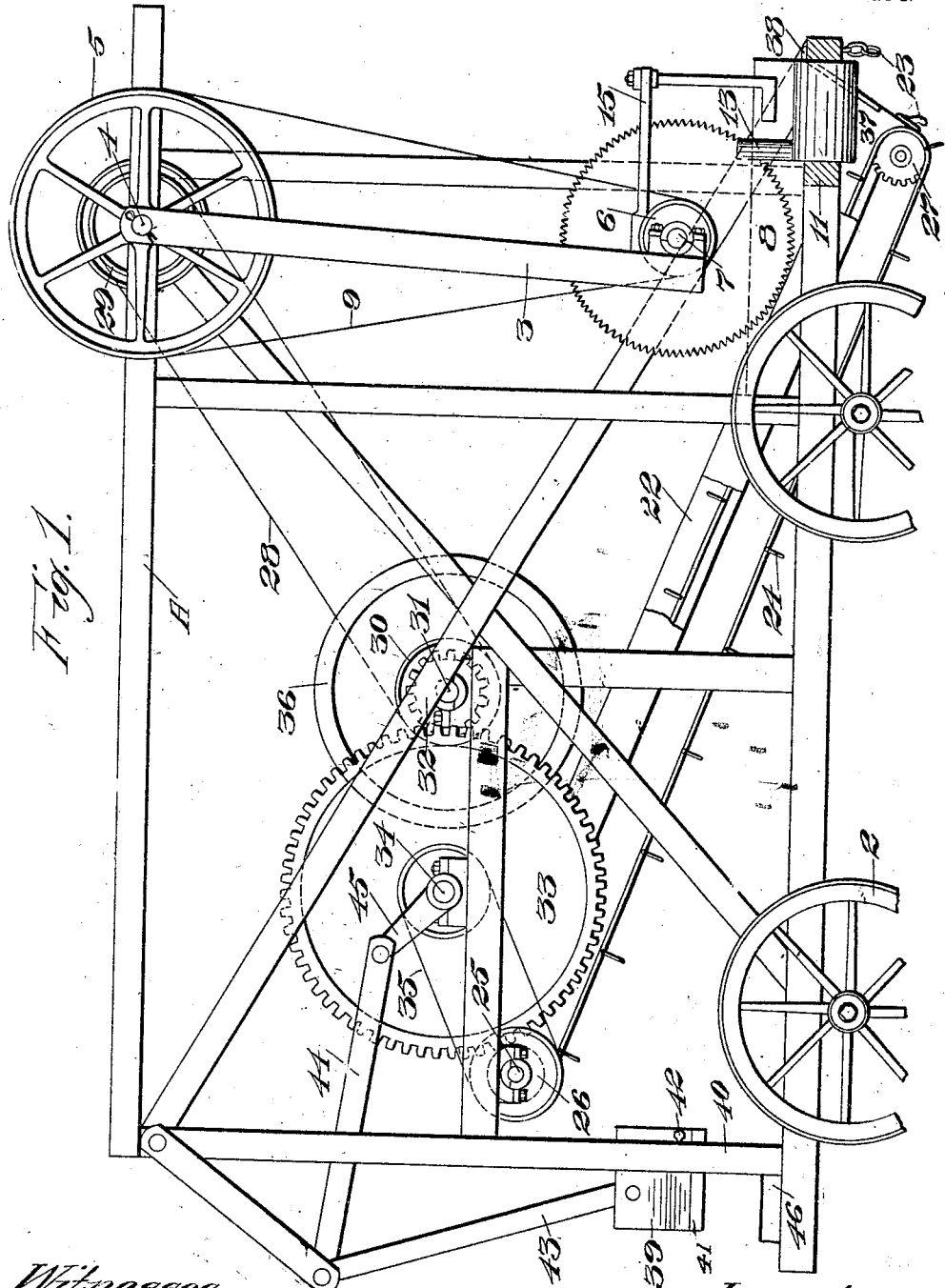

No. 817,628. PATENTED APR. 10, 1906.
J. A. CUMMISKEY.
SAWING MACHINE.
APPLICATION FILED AUG. 29, 1905.

2 SHEETS—SHEET 1.

Witnesses.
F. Hastings.
G. Nurse.

Inventor:
James A. Cummiskey
by Geo. H. Strong, atty.

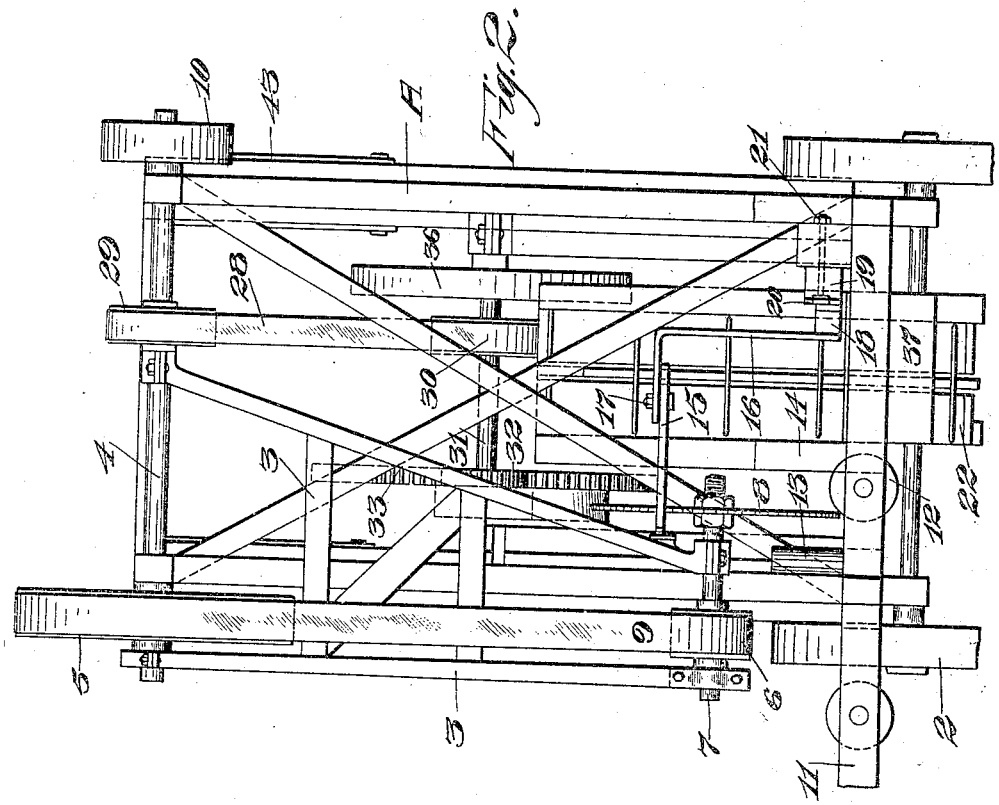

UNITED STATES PATENT OFFICE.

JAMES A. CUMMISKEY, OF CLOVERDALE, CALIFORNIA.

SAWING-MACHINE.

No. 817,628.

Specification of Letters Patent.

Patented April 10, 1906.

Application filed August 29, 1905. Serial No. 276,301.

*To all whom it may concern:*

Be it known that I, JAMES A. CUMMISKEY, a citizen of the United States, residing at Cloverdale, in the county of Sonoma and State of California, have invented new and useful Improvements in Sawing-Machines, of which the following is a specification.

My invention relates to an improved machine for sawing wood into suitable lengths and sizes for burning in stoves, furnaces, and the like.

The object of my invention is to provide a simple, practical, portable machine of large capacity which can be moved readily from place to place and be ready for work at an instant's notice and which can take logs or poles of any length up to two feet more or less in diameter, cut them to the proper lengths, and, if desired, convey these lengths to splitting devices, and which splitting devices are herein shown as operated from the same source of power used to drive the saw.

The invention consists of the parts and the construction and the combination of parts, as hereinafter more fully described and claimed, having reference to the accompanying drawings, in which—

Figure 1 is a side elevation of my sawing-machine. Fig. 2 is an end view of same.

A represents a suitable framework appropriately mounted, if desired, on wheels 2, so as to be easily moved from one place to another. Suitably arranged at one end of the machine is a swinging saw-frame 3, supported on the shaft 4, journaled in frame A. This saw-frame may be of any well-known pattern and is provided with the top and bottom drive-pulleys 5 6, the pulley 5 being mounted on the shaft 4 and the pulley 6 on the shaft or arbor 7, which carries the circular saw 8. The pulleys 5 6 are connected by a belt 9. The saw-frame 3 is mounted to swing loose on the shaft 4 and is prevented from lengthwise movement on the latter by suitable stop means. The shaft 4 is driven from any appropriate source of power, as here shown through the medium of the drive-pulley 10.

The logs or poles or sticks of wood to be sawed are delivered into the path of the saw upon a roller-frame 11, which is detachably connected with the frame A and adapted to extend laterally thereof. The sticks are pushed forward onto a roller 12, journaled in frame A and disposed parallel with the plane of the saw. Adjacent to the inner end of the roller 12 and disposed on each side of the saw are two steel-shod stops or guides 13 14, against which the stick is supported during the sawing operation.

The roller 12 and the guides 13 14 are immediately in advance of the normal pendent position of the saw and saw-frame. Attached to the saw-frame is an angular arm or guide which is adapted to be grasped by the operator to oscillate the saw and which is also adapted and adjustable as a guide and stop to determine the particular length of the cut. As here shown, this arm and guide member is made in two sections 15 16, these sections having horizontally-slotted portions lengthwise adjustable by means of the set bolts and nuts 17 and a drop portion provided with a suitable stop member 18, which is adapted when the saw-frame hangs normally to arrange itself directly in the path of a timber which may be shoved across the roller 12 and against the guides 13 14. This stop member 18 is movable across an adjustable bearing-block 19, secured to the side of the frame A opposite the point of entry into the machine of the logs to be cut.

The block 19 is metal-shod, as likewise is the stop member 18, since the impact of the logs against the member 18 and the frictional contact of the member 18 and the surface of the part 19 would tend otherwise to wear them away.

I have shown the block 19 as faced with a plate or bar 20, made of iron or steel and perforated to receive the bolts 21. The heads of the bolts 21 are countersunk into the plate, and the bolts extend through the block 19 and a side rail of frame A. If two-foot lengths of wood are to be cut, the arms 15 16 are adjusted so that the difference between the saw 8 and the stop 18 equals two feet, and a block 19 of the desired thickness is inserted and locked in place.

The parts 19, 20, and 21 are here shown as removable, since they would otherwise be in the way of the incline conveyer 22, which is pivoted at the upper end near the rear of the frame A and is adapted when the machine is set up for work to have its forward end to drop down below the saw and the ends of the sawed sections. However, when the machine is being moved the depressed end of the conveyer is lifted up and held clear of the ground by any appropriate means, as shown at 23. This conveyer 22 may be of any appropriate pattern. As is here shown, it has a slotted trough in which the flights 24 operate to carry the blocks upward. The upper end of the conveyer is fulcrumed on the shaft 25, journaled in frame A. A sprocket 26 is fastened to shaft 25, and a link belt carrying the flights 24 passes over this sprocket 26 and around a similar sprocket 27, journaled in the lower end of the conveyer-trough.

Power to operate the flights of the conveyer is transmitted from shaft 4 by the following connections: A belt 28 passes around a pulley 29 on shaft 4 and a corresponding pulley 30 on a counter-shaft 31. Counter-shaft 31 carries a smaller gear 32, meshing the larger gear 33 on the shaft 34. From shaft 34 motion is transmitted to shaft 25 by a suitable belt or chain 35, passing over corresponding pulleys or sprockets on the two shafts. The counter-shaft 31 is preferably provided with a balance-wheel 36 to give steadiness to the movement of the several devices and prevent shock to or racking of the parts. In operation the logs to be cut, which have been placed by suitable means on the lateral conveyer 11, are pushed forward into contact with the stop 18 and pressed against the guides 13 14. The operator then takes hold of the arm 15 and draws the saw-frame and saw forward in the manner of such sawing devices to saw off a block. This movement of the saw-frame carries the stop 18 out from between the end of the stick and the adjoining surface of the supporting-block 19, leaving the severed block free to drop onto the conveyer 22 to be carried upward thereon by the flights and discharged at the rear end of the machine. The forward end of the frame A is open at the bottom to allow the conveyer 22 to drop down into a suitable position to receive the sawed lengths of wood. The end of the conveyer is provided with a metal hopper portion 37, inclosing the end and partly inclosing the adjacent sides of the conveyer, so that all the blocks are directed immediately down into the path of the flights. The front portion of this hopper 37 is flanged or bent over, as at 38, to engage the front of the frame A and form a stop or support for the front end of the conveyer 22 when it is dropped down into operative position.

In the type of machine herein shown I have associated certain devices by which the blocks may be split, if desired, and in such machine the sawed blocks from the conveyer 22 are discharged from the rear of the machine adjacent to the splitters 39, which operate in vertical guides 40 in the frame A, and which splitters are driven from the same source of power as the saw and the conveyer 22. These splitters are arranged in large machines with one at each side of the machine, so that two or more men may be constantly employed taking the sawed blocks as they are delivered from the saw and placing them underneath the splitters. These splitters are made with a back guide portion, here shown as vertically channeled to accommodate the guides 40 and with a front or forward knife or wedge portion by which the actual splitting is done.

I prefer to use the removable blades 41, secured in place by a suitable means, as the bolt or bolts 42, whose heads are protected by the guides 40. The reciprocation of a splitter is here shown as effected by a toggle 43, having one member pivoted to the splitter and the other to the top of the frame A, and by a connecting-rod 44, extending from the joint of the toggle to a crank 45 on the shaft 34. Thus it is seen that the crank 45 and the splitter are given a vertical reciprocatory movement to and from the stationary supporting-block 46. In this machine all the moving parts—such as the saw, the conveyer for removing the sawed lengths, and the splitters—are driven from the same source of power.

The machine is compact, and by employing a balanced counter-shaft, as shown, I am able to operate with comparatively little shock and vibration and with a noticeable absence of break-downs so liable to occur in machines of this character.

By using the adjustable stop member 18 and the removable block 19 I can quickly adapt the same machine to cut any desired length of block. By using a stop device such as 18, which is movable out from the end of the timber to be sawed after the same has been placed into position before the saw, I avoid all danger of pinching the saw or having the block stick and refusing to drop down when sawed off. It is a source of frequent annoyance in machines employing a fixed stop to regulate the length of the cut by reason of the sawed length having to drop between two vertical stationary walls, as it were, since a tendency of the severed section is for one of its ends to drop quicker than the other and so for the section to bind against the stop and the saw, with the result that a strain is put on the saw and saw-frame, twisting the saw-frame or else getting the saw out of a true plane, or both. By this machine I am able to and have sawed poles or logs forty feet in length and up to two feet in diameter.

Having thus described my invention, what I claim, and desire to secure by Letters Patent, is—

1. The combination of a frame, a swinging saw-carrier mounted thereon, a saw on said carrier, an angular arm or guide attached to the saw-frame and by which the latter is oscillated, said arm consisting of horizontal and vertical portions said horizontal portions formed of sections adjustable one relative to the other, and said vertical portion provided with a stop member for the timber to be operated upon.

2. The combination of a frame, a swinging saw-carrier mounted thereon, a saw on said carrier, an angular arm or guide attached to the saw-frame and by which the latter is oscillated said arm consisting of horizontal and vertical portions said horizontal portions formed of sections adjustable one relative to the other, and said vertical portion provided with a stop member for the timber to be operated upon, and a removable bearing-block across which the stop is movable, said block being secured to the side of the frame opposite the point of entry into the machine of the timber to be cut.

In testimony whereof I have hereunto set my hand in presence of two subscribing witnesses.

JAMES A. CUMMISKEY.

Witnesses:
  E. A. COOLEY,
  ISAAC S. LEWIS.